(12) United States Patent　　(10) Patent No.: US 8,750,106 B2
Saito　　(45) Date of Patent: Jun. 10, 2014

(54) INTERFACE CONTROL SYSTEM AND INTERFACE CONTROL METHOD

(75) Inventor: Shuichi Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 167 days.

(21) Appl. No.: 13/015,682

(22) Filed: Jan. 28, 2011

(65) Prior Publication Data

US 2011/0188373 A1　Aug. 4, 2011

(30) Foreign Application Priority Data

Feb. 1, 2010　(JP) ................................ 2010-019963

(51) Int. Cl.
*H04L 1/24* (2006.01)

(52) U.S. Cl.
USPC .......................................... 370/230; 370/235

(58) Field of Classification Search
USPC ......................................... 370/229, 230, 235
See application file for complete search history.

(56) References Cited

U.S. PATENT DOCUMENTS

| | | | | |
|---|---|---|---|---|
| 5,265,241 A * | 11/1993 | Arnold et al. | ................... | 710/15 |
| 5,420,988 A * | 5/1995 | Elliott | ............................ | 712/300 |
| 5,892,916 A * | 4/1999 | Gehlhaar et al. | .............. | 709/223 |
| 6,683,880 B2 * | 1/2004 | Kato | ............................... | 370/399 |
| 6,973,026 B1 * | 12/2005 | Dyrga et al. | .................... | 370/218 |
| 7,054,319 B2 * | 5/2006 | Akahane et al. | ......... | 370/395.53 |
| 7,103,807 B2 * | 9/2006 | Bosa et al. | ....................... | 714/43 |
| 7,639,699 B2 * | 12/2009 | Tallet et al. | .................... | 370/401 |
| 7,760,632 B2 * | 7/2010 | Yano et al. | ................. | 370/230.1 |
| 8,103,764 B2 * | 1/2012 | Aviles | ............................ | 709/224 |
| 8,165,067 B2 * | 4/2012 | Xu et al. | ........................ | 370/328 |
| 8,300,523 B2 * | 10/2012 | Salam et al. | ................... | 370/220 |
| 2002/0114276 A1 | 8/2002 | Basturk | | |
| 2006/0004856 A1 * | 1/2006 | Shen et al. | ................ | 707/103 Y |
| 2007/0002826 A1 * | 1/2007 | Bennett et al. | ................ | 370/351 |
| 2008/0298372 A1 * | 12/2008 | Basso et al. | ............. | 370/395.41 |
| 2010/0118882 A1 * | 5/2010 | Gao et al. | ....................... | 370/411 |
| 2010/0290358 A1 * | 11/2010 | Karunakaran et al. | ........ | 370/252 |
| 2010/0290473 A1 * | 11/2010 | Enduri et al. | ............ | 370/395.53 |
| 2011/0211585 A1 * | 9/2011 | Kodaka et al. | ................ | 370/401 |
| 2011/0305167 A1 * | 12/2011 | Koide | ........................... | 370/255 |

FOREIGN PATENT DOCUMENTS

| | | |
|---|---|---|
| JP | 2003-229889 A | 8/2003 |
| JP | 2007180891 A | 7/2007 |
| JP | 2008-153939 A | 7/2008 |

OTHER PUBLICATIONS

The OpenFlow Switch Consortium, Internet, <http://www.openflowswitch.org/>.
Japanese Office Action for JP Application No. 2010-019963 mailed on Oct. 1, 2010 with partial English Translation.

* cited by examiner

*Primary Examiner* — Chi Pham
*Assistant Examiner* — Robert Lopata

(57) ABSTRACT

An interface control system of network equipment, includes: a logical interface which is an interface of a logical group; physical ports which belong to the logical group; and an interface control section configured to incorporate the logical interface and the physical ports as management objects into a management interface when validation of a predetermined function has been performed to each of the logical interface and the physical ports.

9 Claims, 7 Drawing Sheets

Fig. 3

| | VALIDATION OF OPENFLOW FUNCTION | | MANAGEMENT INTERFACE OF OPENFLOW | |
| --- | --- | --- | --- | --- |
| | LAG | PHYSICAL PORTS BELONGING TO LAG | LAG INTERFASE | PHYSICAL PORTS CONFIGURING LAG IF |
| STATUS 1 | VALID | INVALID | OBJTCT | OUT OF OBJECT |
| STATUS 2 | VALID | VALID | OBJTCT | OBJTCT |

※LAG: LINK AGGREGATION GROUP

Fig. 4

| | VALIDATION OF OPENFLOW FUNCTION | | MANAGEMENT INTERFACE OF OPENFLOW | |
| --- | --- | --- | --- | --- |
| | LAG | PHYSICAL PORTS BELONGING TO LAG | LAG INTERFACE | PHYSICAL PORTS CONFIGURING LAG IF |
| STATUS 3 | INVALID | INVALID | OUT OF OBJECT | OUT OF OBJECT |
| STATUS 4 | INVALID | VALID | OUT OF OBJECT | OBJECT |

※LAG: LINK AGGREGATION GROUP

INTERFACE CONTROL SYSTEM AND INTERFACE CONTROL METHOD

INCORPORATION BY REFERENCE

This patent application claims a priority on convention based on Japanese Patent Application No. 2010-019963 filed on Feb. 1, 2010. The disclosure thereof is incorporated herein by reference.

TECHNICAL FIELD

The present invention is related to an interface control system, and particularly, to an interface control system for network units in an open flow (OpenFlow).

BACKGROUND ART

Conventionally, unit management and communication process are performed in a communication unit. As the result of adoption of broadband communication and ALL IP (Internet Protocol) in recent years, it is necessary to perform complicated manipulation and many processes for network, load imposed on a control unit of the communication unit has become heavy. It should be noted that ALL IP means an environment that all the units are connected with an IP network.

In this way, the load on the unit has become heavy with rapid development of a network infrastructure, so that a network configuration itself has become excessively complicated because of diversification of use of the network.

In order to solve the above-mentioned problem, expectation to a new generation network is increasing. At this time, it is required to make it possible to flexibly control the network unit from a control plane, for reconfiguration of architecture and expansion of variety from a clean slate. For this purpose, a mechanism to freely control a network interface from a controller would be required.

At present, as one of the mechanisms to control the network interface from the controller, a mechanism called an "open flow (OpenFlow)" is considered. It should be noted that the open flow (OpenFlow) is an architecture which is prescribed in "The OpenFlow Switch Consortium" (Non-Patent Literature 1).

As one of methods to reinforce the band of a communication line, a method called "Link Aggregation (LA)" is known in which a plurality of physical communication lines between network units are virtually bundled to handle as a single thick communication line.

In order to utilize the characteristics of the open flow (OpenFlow) and to control a flow flexibly, it is necessary to implement both of a link aggregation group (LAG) and a physical port to which the link aggregation group belongs, so as to be a searchable object.

However, in a conventional management, the link aggregation group itself is manipulated as a link aggregation group interface and the physical port for the group is hidden. In this case, a management interface in the open flow (OpenFlow) is the link aggregation group interface. Therefore, the physical port which belongs to the link aggregation group is excluded from a management object in the open flow (OpenFlow).

In the open flow (OpenFlow), in a case of search of a candidacy of the management interface, when the link aggregation group is used as the search object, the physical port cannot be specified as the interface of the search object.

On the contrary, in the open flow (OpenFlow), when the physical port to which the link aggregation group belongs is specified as the search object, the link aggregation group interface cannot be specified as the search object.

It should be noted that as the related technique, a communication system, a packet transmission control method using the same, and a program for the same are disclosed in Japanese Patent Publication (JP 2007-180891A) (Patent Literature 1).

CITATION LIST

Patent Literature

[Patent Literature 1]: JP 2007-180891A

Non-Patent Literature

[Non-Patent Literature 1]: The OpenFlow Switch Consortium <http://www.openflowswitch.org/>

SUMMARY OF THE INVENTION

The present invention provides an interface control system in which both of a link aggregation group itself and a physical port configuring the link aggregation group are managed, controlled and handled as search objects in network equipment.

In an aspect of the present invention, an interface control system of network equipment, includes: a logical interface which is an interface of a logical group; physical ports which belong to the logical group; and an interface control section configured to incorporate the logical interface and the physical ports as management objects into a management interface when validation of a predetermined function has been performed to each of the logical interface and the physical ports.

In another aspect of the present invention, an interface control method of network equipment, is achieved by individually receiving validation of a predetermined function to each of a logical interface which is an interface of a logical group, and physical ports which belong to the logical group; and by incorporating the logical interface and the physical ports as a management object into a management interface when validation of a predetermined function has been performed to each of the logical interface and the physical ports.

In still another aspect of the present invention, a computer-readable tangible recording medium in which a computer-executable program code is stored to attain an interface control method of network equipment, which the interface control method is achieved by individually receiving validation of a predetermined function to each of a logical interface which is an interface of a logical group, and physical ports which belong to the logical group; and by incorporating the logical interface and the physical ports as a management object into a management interface when validation of a predetermined function has been performed to each of the logical interface and the physical ports.

According to the present invention, a flow can be controlled flexibly based on features of open flow (OpenFlow).

BRIEF DESCRIPTION OF THE DRAWINGS

The above and other objects, advantages and features of the present invention will be more apparent from the following description of certain embodiments taken in conjunction with the accompanying drawings, in which:

FIG. 3 is a diagram showing relation of validation of an open flow (OpenFlow) function in an interface of the existing network equipment and incorporation into a management interface;

FIG. 4 is a diagram showing relation of the validation of the open flow (OpenFlow) function in the interface of the existing network equipment and incorporation into a management interface;

DESCRIPTION OF EXEMPLARY EMBODIMENTS

Hereinafter, an interface control system of the present invention will be described in detail with reference to the attached drawings.

First Exemplary Embodiment (Configuration of Existing Network Equipment)

Figure 1:
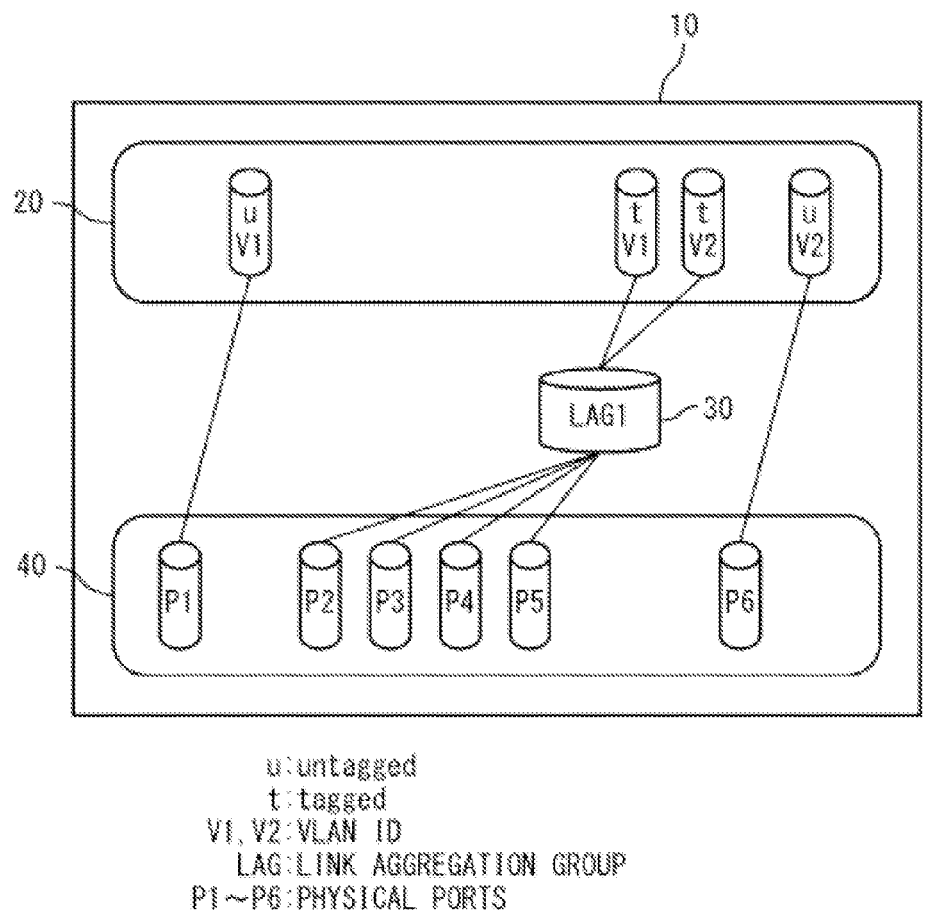
FIG. 1 is a block diagram showing a configuration example of existing network equipment.

FIG. 1 shows a configuration of existing network equipment 10 which attains an open flow (OpenFlow) function.

The existing network equipment 10 has a VLAN (Virtual Local Area Network) interface 20, a link aggregation group interface 30 and physical port group 40.

The VLAN interface 20 is a logical interface for VLAN groups. Here, the VLAN interface 20 contains a VLAN "V1" and a VLAN "V2". The VLAN "V1" and the VLAN "V2" are VLAN numbers (VLAN IDs), and are the VLAN groups corresponding to the VLAN numbers.

The link aggregation group interface 30 is a logical interface of the link aggregation group. Here, the link aggregation group interface 30 functions as a logical interface of a link aggregation group "LAG1".

The physical port group 40 is a physical interface of the existing network equipment 10. The physical port group 40 contains physical ports "P1" to "P6". The physical port "P1" belongs to the VLAN "V1" as an untagged port. The physical port "P1" sets only one untagged port. The physical ports "P2" to "P5" belong to the VLAN "V1" and the VLAN "V2" as tagged ports. The physical ports "P2" to "P5" set the tagged ports regardless of the kind of the VLAN. The physical port "P6" belongs to the VLAN "V2" as an untagged port. Moreover, the physical ports "P2" to "P5" belong to the identical link aggregation group "LAG1". Here, the physical ports "P2" to "P5" configure the link aggregation group interface 30.

It should be noted that the untagged port is a port which uses only one VLAN without using any VLAN tag. That is, the untagged port is a port (access port) which belongs to one VLAN and can transmit and receive a frame in the VLAN.

Also, the tagged port is a port classified based on the VLAN tag. That is, the tagged port is a port (trunk port) which belongs to a plurality of VLANs and transmits and receives a frame in the VLAN.

(Configuration)

Figure 2:
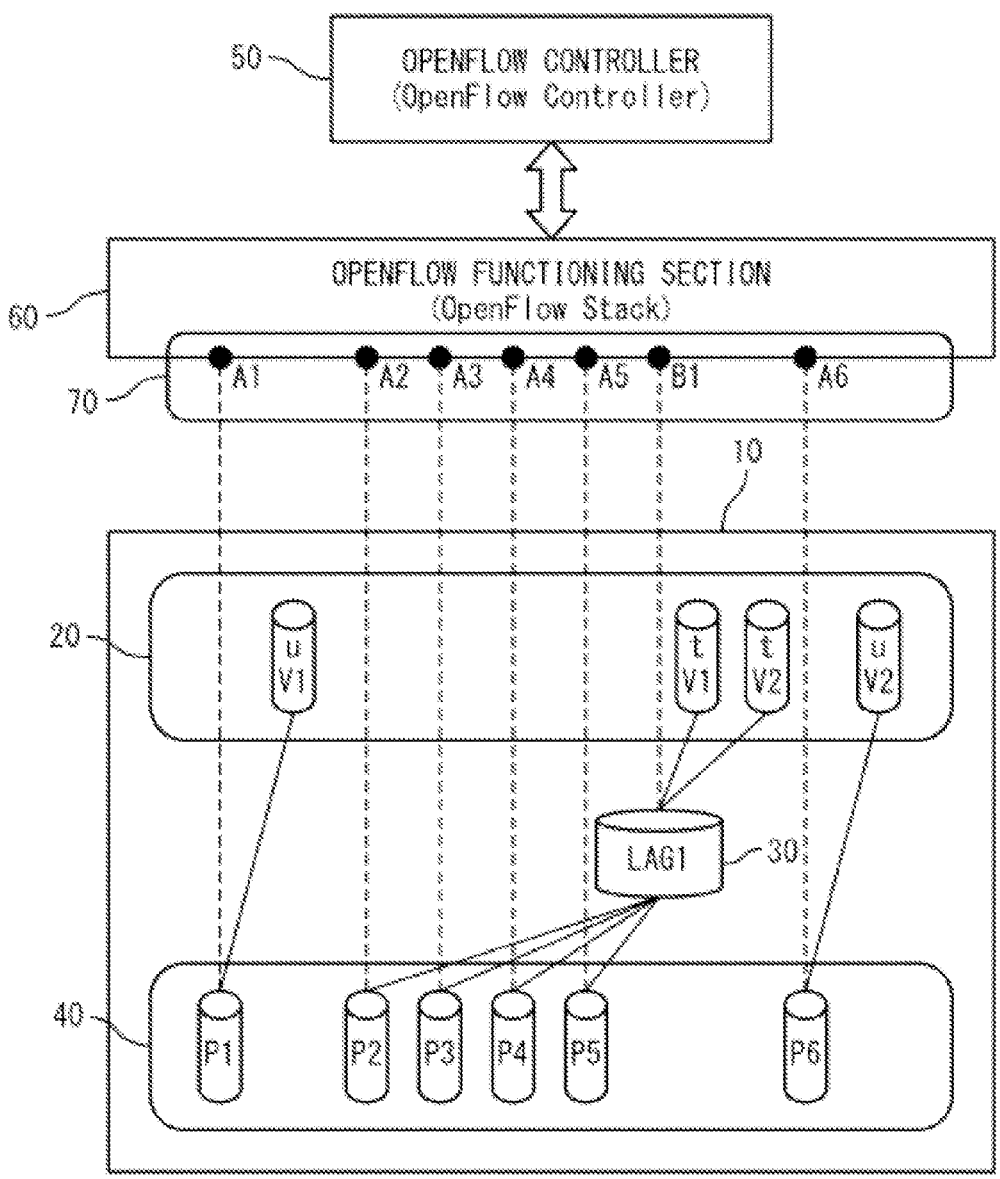
FIG. 2 is a conceptual diagram showing the configuration of an exemplary embodiment of the present invention.

FIG. 2 shows a mapping of an interface as the network equipment which the open flow controller (OpenFlow Controller) manages and the interface of existing network equipment 10.

In FIG. 2, the open flow controller (OpenFlow Controller) 50, an open flow functioning section (OpenFlow Stack) 60 and an open flow interface (OpenFlow Interface) 70 are shown in addition to the existing network equipment 10.

The open flow controller (OpenFlow Controller) 50 sets a multilayer and route data (flow table) in units of a flow to switches according to flow definition data (flow: rule+action) which is set to itself as a routing policy, and performs a routing control and a node control. The open flow controller (OpenFlow Controller) 50 monitors the switches in the network and dynamically sets a distribution route of packets to the switches in the network according to a communication situation. In this way, a function of the routing control is separated from routers and the switches and an optimal routing and a traffic management can be performed by a centralized control by the controller.

The switch which is controlled by the open flow controller (OpenFlow Controller) 50 manipulates communication in units of a flow of end to end, and not in units of packets and frames in conventional routers and switches. In detail, the open flow controller (OpenFlow Controller) 50 controls operations of the switches and nodes (for example, a relay operation of packet data) by setting a flow (rule+action) to every switch and every node.

It should be noted that the switch controlled by the open flow controller (OpenFlow Controller) 50 is called an open flow switch (OpenFlow Switch). Here, the existing network equipment 10 functions as the open flow switch (OpenFlow Switch) by the open flow functioning section (OpenFlow Stack) 60.

The flow table stores data of a flow (flow entry) every switch and every node. The flow includes a rule to define given processing (action) to be performed on packets which meets a given rule. The rule of the flow can be defined and distinguished based on a combination of all or any of an I/O port data (Input/Output Port), a destination address, a source address, a destination port number (Destination Port), and a source port number (Source Port) which are contained in a heading section of a TCP/IP (Transmission Control Protocol/Internet Protocol) packet. It should be noted that it is supposed that the above-mentioned address includes a MAC address (Media Access Control Address) or an IP address (Internet Protocol Address). Also, it is supposed that the above-mentioned port includes a logical port and a physical port.

When validating an open flow (OpenFlow) function to an interface of the existing network equipment 10, the open flow functioning section (OpenFlow Stack) 60 adds the interface to the management interface of the open flow (OpenFlow) function.

Here, when the open flow (OpenFlow) function is validated in the link aggregation group interface 30 based on setting of the existing network equipment 10, the link aggregation group interface 30 is incorporated as the management interface of the open flow (OpenFlow) function on the existing network equipment 10 by the open flow functioning section (OpenFlow Stack) 60.

At this time, the physical ports which belong to the link aggregation group are not automatically incorporated as the management interface of the open flow (OpenFlow) function. When the physical ports which belong to the link aggregation group should be controlled from the open flow controller (OpenFlow Controller) 50, the open flow (OpenFlow) function is validated to each of the physical ports.

The open flow functioning section (OpenFlow Stack) 60 manages the open flow interface (OpenFlow Interface) 70 between the existing network equipment 10 and the open flow controller (OpenFlow Controller) 50.

The open flow interface (OpenFlow Interface) 70 is a management interface of the open flow (OpenFlow) function. That is, the open flow interface (OpenFlow Interface) 70 is a management object by the open flow functioning section (OpenFlow Stack) 60.

The open flow interface (OpenFlow Interface) 70 has physical ports "A1" to "A6" and a link aggregation group interface "B1". The physical ports "A1" to "A6" correspond to the physical ports "P1" to "P6", respectively. The link aggregation group interface "B1" corresponds to the link aggregation group interface 30.

The open flow functioning section (OpenFlow Stack) 60 manages the link aggregation group interface "B1" and all physical ports "A2" to "A5" which configure the interface "B1", as the interface of the existing network equipment 10.

The open flow interface (OpenFlow Interface) 70 notifies interface data of these interfaces to the open flow controller (OpenFlow Controller) 50 by use of an open flow protocol (OpenFlow Protocol). Moreover, the open flow interface (OpenFlow Interface) 70 accepts reference from the open flow controller (OpenFlow Controller) 50. A port status message and a port, module (Port Mod) message are used for a change notice of the port status.

When acquiring port data from the open flow Controller (OpenFlow Controller) 50, the open flow interface (OpenFlow Interface) 70 uses a feature request/reply message.
(Open Flow Controller (OpenFlow Controller))

As an example of the open flow controller (OpenFlow Controller) 50, a computer is assumed such as a PC (personal computer), a work station, a main frame, and a supercomputer. Or, a relay unit, a peripheral device, an extension board and so on may be used as the controller 50 in addition to a terminal and a server. Also, the controller 50 may be realized under virtual machine (Virtual Machine (VM)) environment. However, actually, the present invention is not limited to these examples.
(Open Flow Functioning Section (OpenFlow Stack))

The open flow functioning section (OpenFlow Stack) 60 includes a hardware unit such as a processor operating based on a software program, the software program which drives the hardware unit and executes a desired process, and a storage unit which stores the software program and data of all kinds.

As an example of the above-mentioned processor, a CPU (Central Processing Unit), a microprocessor, a microcontroller, or a semiconductor integrated circuit (IC) which has a similar function to them is used. However, actually, the present invention is not limited to these examples.

As an example of the above-mentioned storage unit, a semiconductor memory unit such as RAM (Random Access Memory), ROM (Read Only Memory), EEPROM (Electrically Erasable and Programmable Read Only Memory) and flash memory are used. Also, an auxiliary storage unit such as HDD (Hard Disk Drive) and SSD (Solid State Drive) may be used. Or, a removable disk such as a DVD (Digital Versatile Disk) and an SD memory card (Secure Digital Memory Card) and so on and a recording medium (media) may be used. Actually, the present invention is not limited to these examples.

It should be noted that the existing network equipment 10 may be provided with the processor and the storage unit. The software program by which the processor (not shown) of the existing network equipment 10 operates as the open flow functioning section (OpenFlow Stack) 60 may be received via the network, or may be read from a tangible storage medium which has been set in the existing network equipment 10, and then be executed.
(Operation)

Referring to the interface data shown in FIGS. 3 to 6, a change in a status of the interface of the existing network equipment 10 and an operation thereof will be described.

When the open flow (OpenFlow) function is validated to the interface of the existing network equipment 10, the open flow functioning section (OpenFlow Stack) 60 adds the interface to the management interface of the open flow (OpenFlow) function.

The validation of the open flow (OpenFlow) function to the interface of the existing network equipment 10 can be individually set in each of the interfaces irrespective of a type of the interface.

Even when the open flow (OpenFlow) function is validated to the link aggregation group interface 30, the physical ports of the group 40 which configure the link aggregation group interface 30 are not automatically incorporated as the interfaces of the open flow switch (OpenFlow Switch). That is, until it is separately confirmed that the open flow (OpenFlow) function is validated to each of the physical ports of the group 40, the physical port is not automatically incorporated. The link aggregation group interface 30 and the physical ports of the group 40 are independently controlled.

For example, like a status 1 in FIG. 3, when the physical ports of the group 40 which belong to the link aggregation group are not validated as the open flow (OpenFlow) function, the management interface of the open flow (OpenFlow) function becomes the link aggregation group interface 30, and the physical ports of the group 40 which belong to the link aggregation group are out of the management object of the open flow (OpenFlow) function.

Also, like a status 2 in FIG. 3, when it is desired to incorporate both of the link aggregation group interface 30 and the physical ports of the group 40 which configure the link aggregation group interface 30 into the management interface of the open flow (OpenFlow) function at the same time, the incorporation can be realized by performing the validation of the open flow (OpenFlow) function to each of the link aggregation group interface 30 and the physical ports of the group 40.

Also, in a status 3 in FIG. 4, because the open flow (OpenFlow) function is not validated to the link aggregation group and the physical ports of the group 40 which belong to the link aggregation group, the link aggregation group interface 30 and the physical ports of the group 40 which configure the link aggregation group interface are out of the management interface of the open flow (OpenFlow) function.

Also, like a status 4 of FIG. 4, when the open flow (OpenFlow) function is validated to only the physical ports which belong to the link aggregation group, the link aggregation group interface 30 configured from the physical ports of the group 40 is out of the management object interface of the open flow (OpenFlow) function.
(Deletion of Physical Port)

Figure 5:
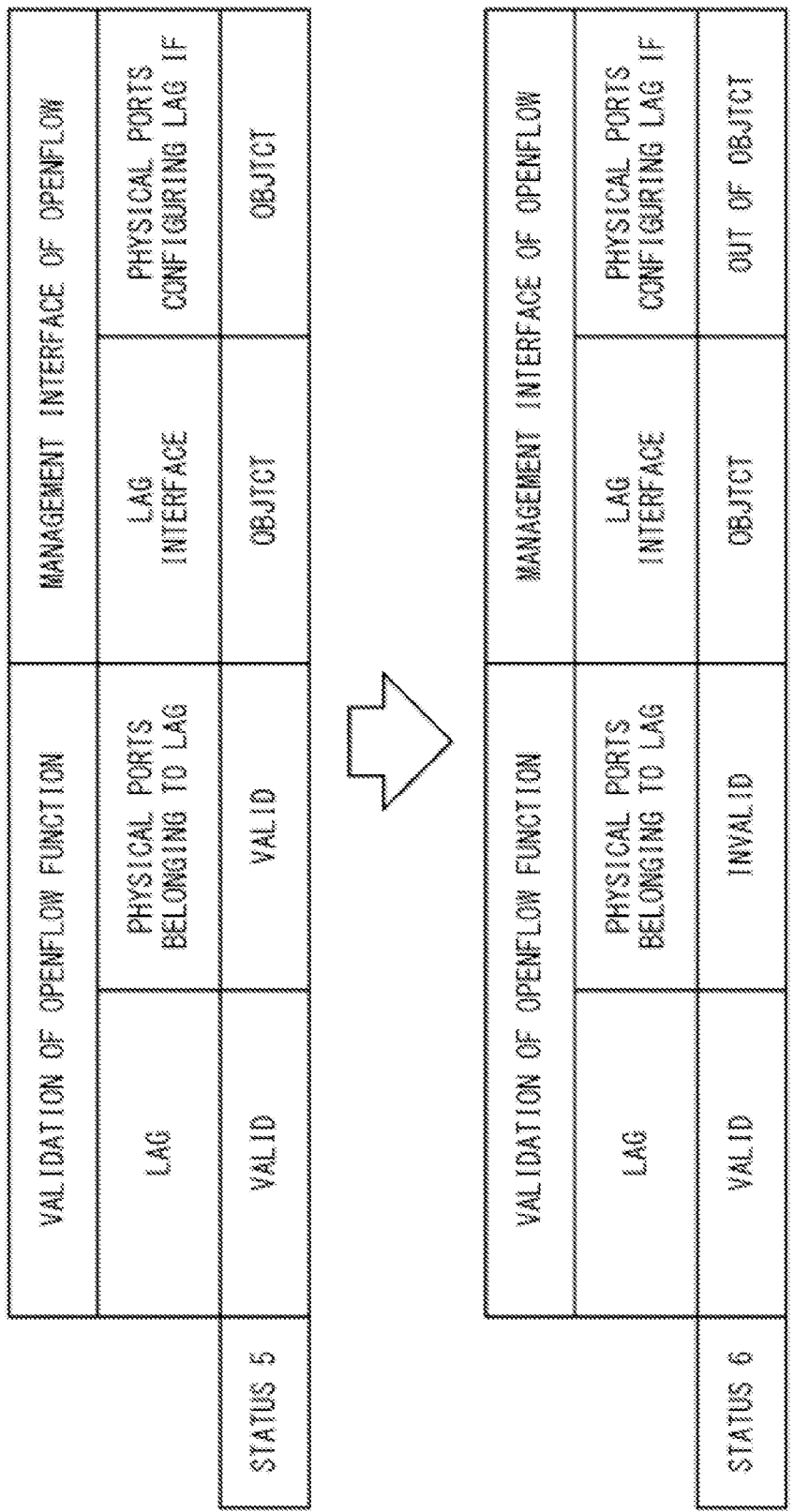
FIG. 5 is a diagram showing relation of the validation of the open flow (OpenFlow) function in the interface of the existing network equipment and incorporation into a management interface.

As shown in FIG. 5, the open flow (OpenFlow) function is invalidated to the physical ports of the group 40 (transition from status 5 to status 6). In this case, the physical ports of the group 40 are deleted from the management interface of the open flow (OpenFlow) function by the open flow functioning section (OpenFlow Stack) 60. After that, the open flow functioning section (OpenFlow Stack) 60 issues a deletion notice of the physical ports 40 to the open flow controller (OpenFlow Controller) 50 (transmit).

(Deletion of Link Aggregation Group Interface)

Figure 6:
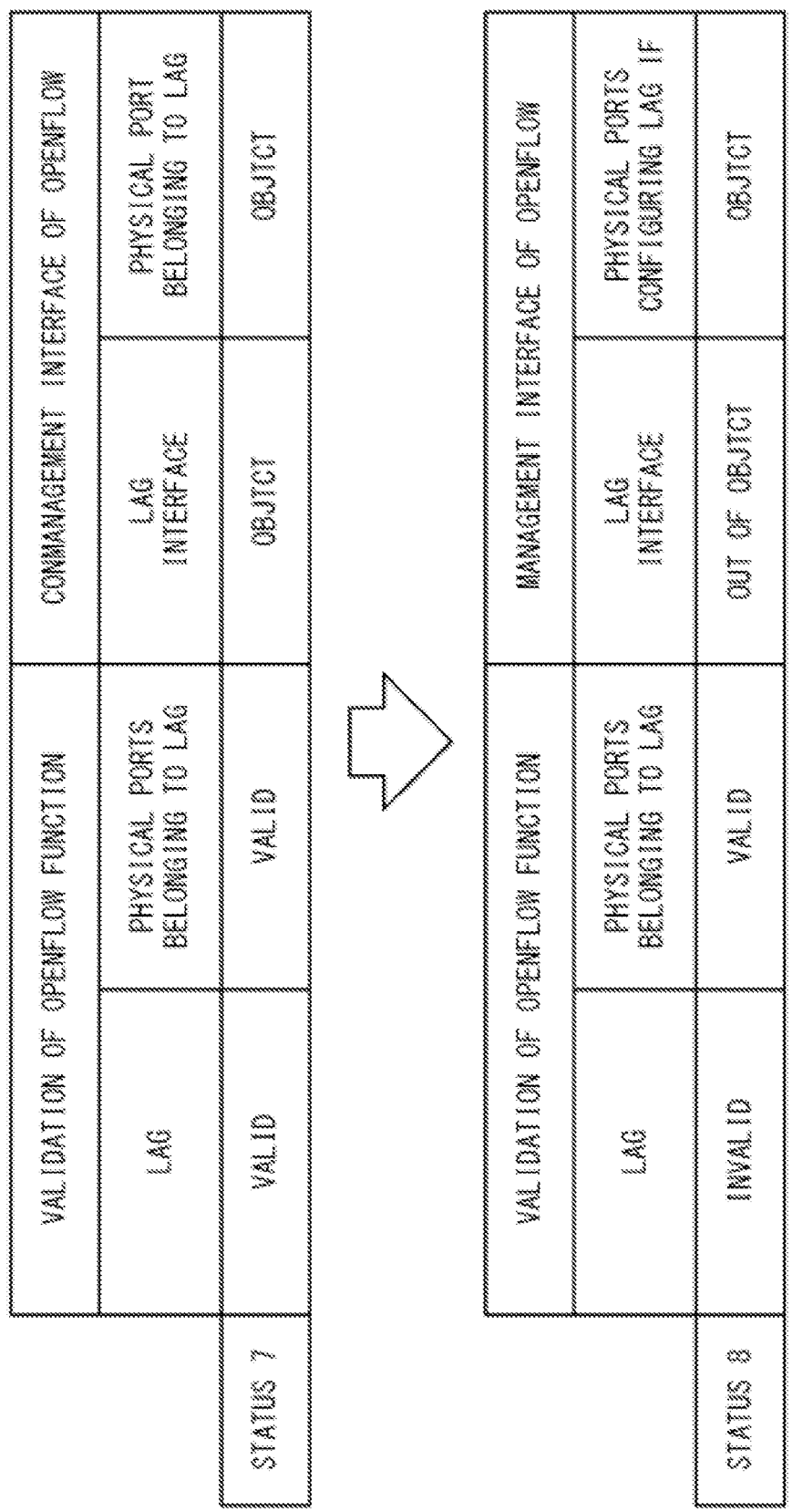
FIG. 6 is a diagram showing relation of the validation of the open flow (OpenFlow) function in the interface of the existing network equipment and incorporation into a management interface.

As shown in FIG. 6, the open flow (OpenFlow) function is invalidated to the link aggregation group interface 30, or the link aggregation group interface 30 is deleted from the configuration of the network equipment (transition from status 7 to status 8). In this case, the link aggregation group interface 30 is deleted from the management interface of the open flow (OpenFlow) function by the open flow functioning section (OpenFlow Stack) 60. After that, the open flow functioning section (OpenFlow Stack) 60 issues a deletion notice of the link aggregation group interface to the open flow controller (OpenFlow Controller) 50 (transmit).

In this way, a flow entry which is a feature of the open flow protocol (OpenFlow Protocol) can be registered to both of the link aggregation group interface 30 and the physical ports 40, which are shown in FIG. 2. Also, in addition to a logical interface which is the link aggregation group interface 30, the registration of the flow becomes flexibly possible to the physical ports of the group 40 which configure the logical interface.

According to the present invention, it becomes possible to perform the open flow protocol (OpenFlow Protocol) management based on the network equipment which is used in the existing IP network.

In the present invention, the interface of the existing network equipment can be incorporated as the management interface of the open flow (OpenFlow) function without developing any new network equipment.

Also, in the present invention, the link aggregation group interface and the physical ports belonging to the link aggregation group can be individually managed by using the network equipment which is used in the existing IP network. Thus, it is possible to manage and manipulate the interfaces of the equipment configuring the network freely and flexibly.

Also, in the present invention, usually, the link aggregation group interface selects an output destination physical port belonging to the link aggregation group based on a distribution algorithm inside the equipment. However, it becomes possible for a user to control the output destination physical port optionally by allowing the interface registration of both under the management of the open flow (OpenFlow).

Second Exemplary Embodiment

Next, referring to the drawings, a second exemplary embodiment of the present invention will be described.

In the present exemplary embodiment, in addition to the link aggregation group interface, a VLAN interface is added as a management object. The link aggregation group and the VLAN group are virtual groups (logical groups).

Figure 7:
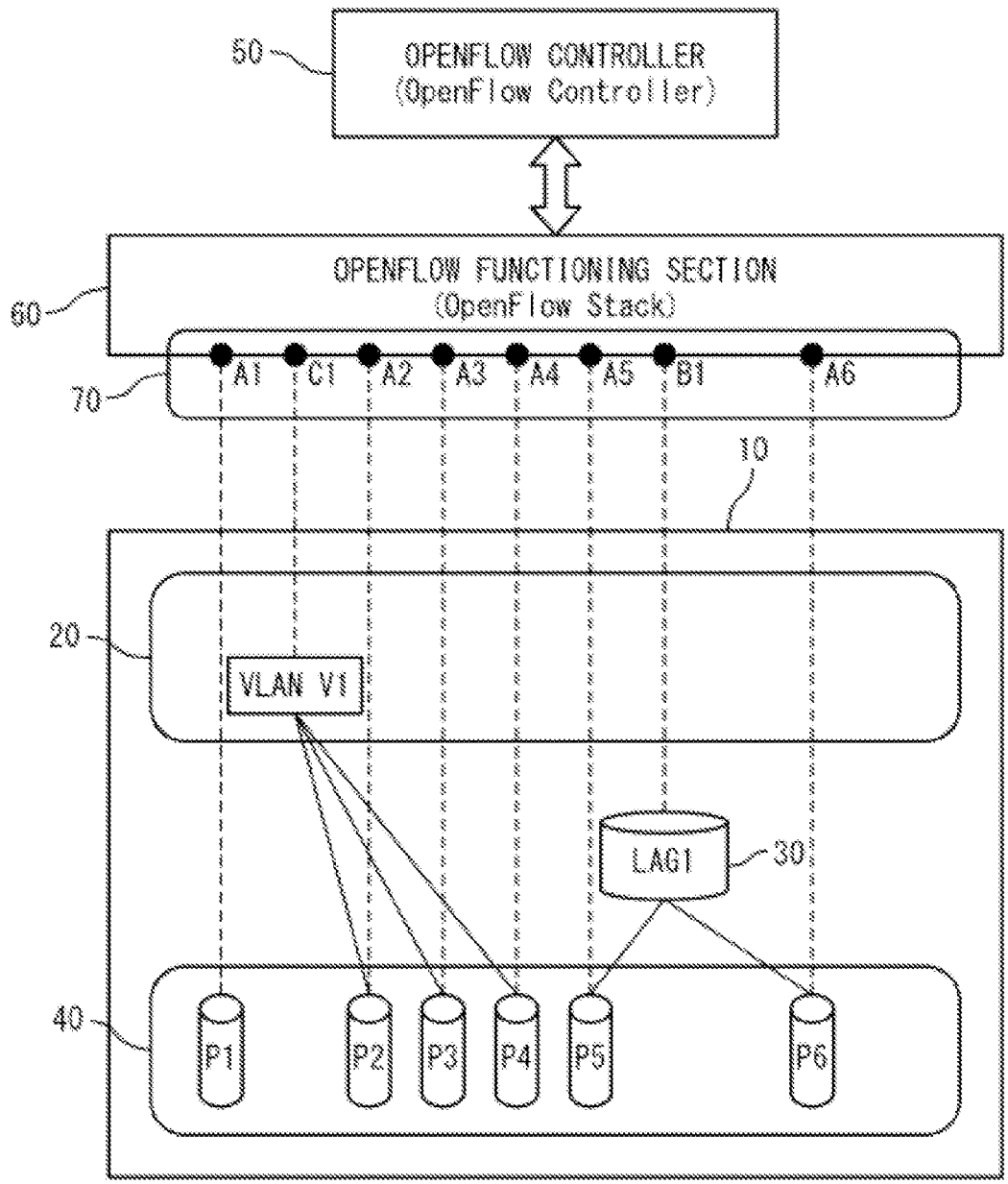
FIG. 7 is a conceptual diagram showing the configuration of another exemplary embodiment of the present invention.

In FIG. 7, a VLAN interface 20 has a VLAN "V1". The physical port group 40 includes the physical ports "P1" to "P6". An open flow interface (OpenFlow Interface) 70 has the physical ports "A1" to "A6", a link aggregation group interface "B1" and a VLAN interface "C1".

Here, the physical ports "P2" to "P4" belongs to the VLAN "V1". That is, the physical ports "P2" to "P4" configure the VLAN interface 20. The physical ports "P5" and "P6" belong to the link aggregation group "LAG1". That is, the physical ports "P5" and "P6" configure the link aggregation group interface 30.

The physical ports "A1" to "A6" correspond to the physical ports "P1" to "P6". The link aggregation group interface "B1" corresponds to the link aggregation group interface 30. The VLAN interface "C1" corresponds to the VLAN "V1".

As shown in FIG. 7, the VLAN interface and the physical ports which configure the VLAN interface can be independently set as the management interfaces of the open flow (OpenFlow) function by mapping the VLAN interface and the physical ports which configure the VLAN interface.

(Features of the Invention)

As mentioned above, in the interface control system of the network equipment in the open flow (OpenFlow) according to the present invention, the link aggregation group itself and the physical ports which belong to the link aggregation group can be manipulated as the object of the management, control and search. Thus, flexible control becomes possible.

The present invention can be used as one of the methods of configuring an interface of communication equipment in network infrastructure.

Especially, it is useful in interface control by the open flow controller (OpenFlow Controller) 50 in the open flow protocol (OpenFlow Protocol).

<Supplement Description>

The present invention is related to an interface control system of network equipment, and is not related to a packet distributing system by the link aggregation and a method of managing the link aggregation.

In the present invention, the network equipment is controlled by a controller due to the characteristic of the open flow (OpenFlow) protocol.

When a link aggregation function is used in the usual network equipment used, the control object is only the link aggregation group interface (logical interface defined by logically grouping a plurality of physical ports) or the physical ports which do not belong to the link aggregation group.

Also, at this time, the physical ports which configure the link aggregation group interface are out of the control object.

In this way, usual network equipment specifies a transmission destination physical port which belongs to the link aggregation group in reception of a packet.

In the present invention, the interface control system is realized in which the link aggregation group interface, the physical ports which belongs to the link aggregation group, the physical ports which do not belong to the link aggregation group can be independently specified.

(Addion)

In the interface control system, an interface control section transmits a status change notice to an external controller which controls network equipment when a status change has occurred as a result of validation/invalidation of a predetermined function to at least one interface of a logical interface and the physical ports.

As described above, the exemplary embodiments of the present invention have been described in detail, but actually, the present invention is not limited to the above-mentioned exemplary embodiments and any modification without deviating from the spirit of the present invention is contained in the present invention.

What is claimed is:

1. An interface control system of network equipment, comprising:
 a logical interface which is an interface of a link aggregation group relating to a network;
 physical ports which belong to said link aggregation group; and
 an interface control section configured to incorporate said logical interface and said physical ports as management objects into a management interface when validation of a predetermined function has been performed to each of said logical interface and said physical ports, wherein the network comprises an OpenFlow network in which packet routing is determined in accordance with a flow entry registered in an OpenFlow switch from an OpenFlow controller, wherein the predetermined function comprises a relay operation of packet data, wherein the interface control section is configured to register the flow entry such that the logical interface and the physical ports belonging to said link aggregation group are individually managed.

2. The interface control system according to claim 1, wherein said interface control section manipulates each of said physical ports to be out of the management object without automatically incorporating said physical port into said management interface, until it is confirmed that the validation of the predetermined function has been performed to said physical port, even when the validation of the predetermined function has been performed to said logical interface.

3. The interface control system according to claim 1, wherein said interface control section manipulates an invalidated interface to be out of the management object by deleting said invalidated interface that the predetermined function is invalidated, from said management interface, if invalidation of the predetermined function has been performed to said at least one interface of said logical interface and said physical ports when said logical interface and said physical ports have been incorporated into said management interface as the management object.

4. An interface control method of network equipment, comprising:
 individually receiving validation of a predetermined function to each of a logical interface which is an interface of a link aggregation group, and physical ports which belong to said link aggregation group; and
 incorporating said logical interface and said physical ports as a management object into a management interface when validation of a predetermined function has been performed to each of said logical interface and said physical ports.

5. The interface control method according to claim 4, further comprising:
 manipulating each of said physical ports to be out of the management object without automatically incorporating said physical port into said management interface, until it is confirmed that the validation of the predetermined function has been performed to said physical port, even when the validation of the predetermined function has been performed to said logical interface.

6. The interface control method according to claim 4, further comprising:
 receiving invalidation of the predetermined function to at least one interface of said logical interface and said physical ports when said logical interface and said physical ports as the management object have been incorporated into said management interface; and
 manipulating an invalidated interface to be out of the management object by deleting the invalidated interface in which the predetermined function has been invalidated, from said management interface, when the invalidation of the predetermined function has been performed to at least one interface of said logical interface and said physical ports.

7. A non-transitory computer-readable tangible recording medium in which a computer-executable program code is stored to attain an interface control method of network equipment, which said interface control method comprises:
 individually receiving validation of a predetermined function to each of a logical interface which is an interface of a link aggregation group relating to a network, and physical ports which belong to said link aggregation group; and
 incorporating said logical interface and said physical ports as a management object into a management interface when validation of a predetermined function has been performed to each of said logical interface and said physical ports,
 wherein the network comprises an OpenFlow network in which packet routing is determined in accordance with a flow entry registered in an OpenFlow switch from an OpenFlow controller,
 wherein the predetermined function comprises a relay operation of packet data,
 wherein the flow entry is registered such that the logical interface and the physical ports belonging to said link aggregation group are individually managed.

8. The non-transitory computer-readable tangible recording medium according to claim 7, wherein said interface control method further comprises:
 manipulating each of said physical ports to be out of the management object without automatically incorporating said physical port into said management interface, until it is confirmed that the validation of the predetermined function has been performed to said physical port, even when the validation of the predetermined function has been performed to said logical interface.

9. The non-transitory computer-readable tangible recording medium according to claim 7, wherein said interface control method further comprises:
 receiving invalidation of the predetermined function to at least one interface of said logical interface and said physical ports when said logical interface and said physical ports as the management object have been incorporated into said management interface; and
 manipulating an invalidated interface to be out of the management object by deleting the invalidated interface in which the predetermined function has been invalidated, from said management interface, when the invalidation of the predetermined function has been performed to at least one interface of said logical interface and said physical ports.

* * * * *